United States Patent [19]

Gallagher et al.

[11] 3,775,158

[45] Nov. 27, 1973

[54] COMPOSITE ARTICLE CONTAINING AN ALPHA-OLEFIN HYDROCARBON COPOLYMER

[75] Inventors: George A. Gallagher, Media, Pa.; Henry C. Walter, Wilmington, Del.

[73] Assignee: E. I. du Pont de Nemours and Company, Wilmington, Del.

[22] Filed: Oct. 18, 1971

[21] Appl. No.: 189,836

Related U.S. Application Data

[60] Division of Ser. No. 793,633, Nov. 20, 1968, Division of Ser. No. 571,393, Aug. 10, 1968, which is a continuation-in-part of Ser. No. 359,441, April 13, 1964, abandoned.

[52] U.S. Cl. ........... 117/72, 117/76 T, 117/138.8 N, 117/138.8 F, 117/145, 156/110 A, 156/308, 156/315, 156/330, 156/331, 156/333, 156/335, 161/227, 161/231, 260/29.3
[51] Int. Cl. ..................... C09j 3/12, B32b 25/08
[58] Field of Search .................... 117/76 T, 138.8 F, 117/138.8 N, 72, 145; 156/333, 335, 110 A; 161/227, 231

[56] References Cited
UNITED STATES PATENTS

| | | | |
|---|---|---|---|
| 3,276,948 | 10/1966 | Gallagher | 156/333 X |
| 3,513,057 | 5/1970 | Falcone et al. | 156/333 |
| 3,307,966 | 3/1967 | Shoaf | 117/138.8 F X |
| 3,464,878 | 9/1969 | Schwarz | 117/138.8 F X |
| 3,262,482 | 7/1966 | Clifton et al. | 117/76 T X |
| 3,433,664 | 3/1969 | Osborne | 117/76 T |
| 3,533,831 | 10/1970 | Torti et al. | 117/76 T |
| 3,427,183 | 2/1969 | Portolani et al. | 117/76 T |
| 3,260,641 | 7/1966 | Falcone | 156/333 X |

*Primary Examiner*—Ralph Husack
*Attorney*—Raymond E. Blomstedt

[57] ABSTRACT

A composite article consisting of a cured chain-saturated copolymer of an alpha-monoolefin and a non-conjugated hydrocarbon diene which is adhered by a dried cured coating to a substrate such as a polyamide by a coating made from an aqueous dispersion containing a chlorosulfonated polyethylene and a resorcinol-formaldehyde type resin. If the substrate is a polyester the article needs a precoat.

7 Claims, No Drawings

COMPOSITE ARTICLE CONTAINING AN ALPHA-OLEFIN HYDROCARBON COPOLYMER

This is a division of U.S. Pat. application Ser. No. 793,633, filed Nov. 20, 1968, now U.S. Patent 3,687,777, which in turn is a division of copending U.S. Pat. application Ser. No. 571,393, filed Aug. 10, 1968 now U.S. Patent 3,502,603, which is in turn a continuation-in-part of copending U.S. Pat. application Ser. No. 359,441, filed Apr. 13, 1964 now abandoned.

This invention relates to a new adhesive composition and its use for bonding α-olefin hydrocarbon polymers to selected materials.

Sulfur-curable, chain saturated α-olefin hydrocarbon polymers (for example, copolymers of ethylene, propylene and non-conjugated dienes) are acquiring increasing importance today in the manufacture of a wide variety of useful products. Applications such as tires, industrial belts, tarpulins, and the like require that the polymers be bonded to substrate materials such as nylon and rayon.

The adhesives currently available for bonding these polymers to substrates of this type have not been entirely satisfactory. For example, the customary tire cord dips have provided inadequate bonding. Better results have been obtained by applying an organic solvent solution of selected adhesives over the coated cords, but this procedure is economically undesirable for several reasons. Application of the second coat entails additional labor charges and storage costs. Furthermore, the handling and recovery of the volatile organic solvents used in the coating require extra plant investment and still more operating expense. For reasons of both operating safety and economy, many plants are only equipped at the present to use aqueous dispersions.

It has unexpectedly been found that a sulfur-curable, chain-saturated α-olefin hydrocarbon copolymer can be firmly adhered to a polyamide or cellulosic substrate by a one-step coating of the substrate with an aqueous dispersion containing (a) a chlorosulfonated polyethylene and (b) a resorcinol-formaldehyde type resin, drying the coating material, and curing the hydrocarbon copolymer while pressing it in contact with the coated substrate. Moreover, the α-olefin hydrocarbon copolymers can be appplied to polyester substrates using the one-step coating described provided that such substrates are treated according to the teachings of Shoaf, U.S. Pat. application Ser. No. 320,605, filed Oct. 29, 1963, now U.S. Pat. No. 3,307,966 or Schwarz, U.S. Pat. application Ser. No. 509,436, filed Nov. 23, 1963, now U.S. Pat. No. 3,464,878. The details of such treatments will be discussed hereinafter.

The substrates being bonded to the α-olefin hydrocarbon polymers include the normally-solid polyamide, polyester and cellulosic substrates. In a particularly valuable application of the present invention, these materials are in the form of woven fabrics, tire cords, filaments, spun fibers or blends thereof. Representative examples are the industrial fibers such as nylon, rayon, and polyethylene terephthalate.

The sulfur-curable, chain-saturated α-olefin hydrocarbon copolymer is generally a copolymer of at least one α-monoolefin having the structure R-CH=CH$_2$ wherein R is hydrogen or alkyl of 1 to 16 carbon atoms (e.g., ethylene, propylene, 1-hexene), with at least one non-conjugated hydrocarbon diene (e.g., 1,4-hexadiene). The most preferred class of copolymers include those containing about 20 to 75 weight percent ethylene monomer units. Representative copolymers include ethylene/propylene/1,4-hexadiene; ethylene/1,4-hexadiene; ethylene/propylene/dicyclopentadiene; ethylene/propylene/5-methylene-2-norbornene; and ethylene/propylene/1,5-cyclooctadiene. Other suitable monomers, copolymers and preparations are disclosed in U.S. Pat. Nos. 2,933,480; 3,000,866; 3,063,973; 3,093,620; 3,093,621; and 3,200,174; and French Pat. Nos. 1,321,029 and 1,371,435; and British Pat. No. 957,105.

One of the important components of the adhesive composition is an aqueous latex of a chlorosulfonated olefin polymer. The chlorosulfonated olefin polymers and their preparation are well known to those skilled in the art, and can be prepared in a number of ways, e.g., those processes set forth in U.S. Pat. Nos. 2,212,786; 2,586,363; 2,646,422; 2,862,917; 2,879,261; 2,972,604; and 2,982,759. Preferred polymers are those prepared by chlorosulfonation of polyethylenes having densities from about 0.94 to 0.96 g./cc. and melt indexes of about 0.07 to 4 decigrams/min. (ASTM Method D-1238-57T). The preferred chlorosulfonated polymers contain about 10 to 26 percent chlorine (preferably 15 to 20 percent) and about 0.5 to 3 percent (preferably 0.7 to 3 percent) sulfur, by weight. Polymers prepared by chlorosulfonation using SO$_2$CC$_2$ seem to yield somewhat less bonding strength.

Suitable latexes are prepared from organic solutions of chlorosulfonated polyethylene in a conventional manner. In a typical and preferred procedure the polymer solution is mixed with water containing a surface-active agent stable under acidic pH conditions. Removal of the organic solvent from the resulting emulsion gives the latex. Water soluble organic emulsifying agents, or mixtures thereof, which will give oil-in-water emulsions are used. The term "oil-in-water" emulsifying agents is well understood by those skilled in the art and is set out in detail in the book "Surface Active Agents," Schwarz and Perry, Interscience Publishers, Inc. (1949), pages 9–12, 54, 116–120. Particularly useful anionic emulsifying agents are the sodium salts of long-chain alkyl-substituted aryl sulfonic acids or long-chain alkyl sulfonic acids or long-chain alkyl hydrogen sulfates. A particularly preferred procedure involves the use of a minor proportion of an emulsification modifier, soluble in both the aqueous and the oil phase. A preferred example is isopropanol. The modifier is introduced prior to the formation of the latex; it should not be added to the latex because it can cause coagulation. Those skilled in the art can determine the optimum amount to employ for a particular system. If too little modifier is employed, the resulting latex may not have as fine a particle size as desired. Excessive proportions of modifier may lead to coagulum formation. Detailed procedures for making latexes are given in U.S. Pat. No. 2,968,637.

The phenol-aldehyde type resin solution which is the other important component of the adhesive composition, is preferably made by reacting formaldehyde (or materials furnishing formaldehyde such as paraformaldehyde), with a phenolic component, e.g., a dihydroxybenzene such as resorcinol, which is preferred. Such resins can be made by procedures familiar to those skilled in the art. The relative proportion of aldehyde to phenolic component can be varied. In representative procedures about 0.7 to 2 moles of formaldehyde have been supplied for each mole of resorcinol. The condensation can be carried out under basic conditions, e.g., at a pH in the range 8–9 in the presence of a strong basic material such as an alkali metal hydroxide. For use on rayon, the latex is preferably basic, i.e., a pH of 8–9. For use on nylon, it is preferred to carry out the condensation of the resin in the presence of the chlorosulfonated polyethylene latex at a pH of 7 to 7.5 using NaOH or ZnO; the dip made this way should be aged 24–30 hours. Another procedure involves the use of a pre-condensed resin (e.g., "Penacolite R–2170" available from Koppers Co.) condensed with additional formaldehyde at a pH of 7.5 to 8; this dip preparation requires only 2 to 4 hours aging. The mixture of resorcinol, formaldehyde, and catalyst is usually allowed to react at a temperature of about 25° C., but higher temperatures may be employed to hasten the reaction if desired. For best results when conducting alkaline condensations, it is essential to stop the condensation quickly to hold down the molecular weight. Neutralization with acid will do this. The time needed to carry out the reaction can be determined by routine experimentation. The formaldehyde/resorcinol resin can be used at once, if desired.

An alternative procedure involves the in situ preparation of the resorcinol/aldehyde condensate in the presence of the chlorosulfonated polyethylene latex. In this process the formaldehyde, resorcinol and optionally a basic oxide or hydroxide (e.g., zinc oxide or sodium hydroxide) are mixed with the chlorosulfonated polyethylene latex and the composition subsequently allowed to stand at room temperature until ready for use. Empirical routine testing can be used to find out the amount of time needed to age the composition to get optimum results. About 24 to 30 hours aging is preferred.

The relative proportions of the chlorosulfonated polyethylene and the formaldehyde resorcinol resin in the adhesive can be varied quite widely to suit the needs of the particular application. In representative adhesive compositions about two to six proportions of chlorosulfonated polyethylene have been employed for every proportion by weight of the phenol-aldehyde type resin.

In the first step of the process of the present invention the substrate (e.g., the fabric) is coated with the aqueous adhesive composition. This composition may be applied in any menner desired, such as by dipping, painting, or by roller coating. The coating is then dried at an elevated temperature such as 135° C. The amount of adhesive applied is not particularly critical; representative amounts range from about 5 to 15 percent by weight of the fabric. When the substrate is a polyester, e.g., polyethylene terephthalate fabric or tire cord, a pretreatment is applied before employing the teachings of our invention. Shoaf, U.S. Pat. application Ser. No. 320,605, filed Oct. 29, 1963, now U.S. Pat. No. 3,307,966, discloses pretreatment with a mixture of (a) a polyepoxide and (b) an aromatic polyisocyanate or adduct thereof, optionally, with an overcoat of a resorcinol-formaldehyde resin and a vinyl pyridine copolymer latex mixture (see Example 11). Schwarz, U.S. Pat. application Ser. No. 509,436, filed Nov. 23, 1965, now U.S. Pat. No. 3,464,878, discloses pretreatment with a mixture of (a) 2-pyrrolidone, (b) polyepoxide, (c) alkaline catalyst and (d) optionally, a blocked isocyanate or formaldehyde (see Example 12). The polyepoxide is preferably a condensation product of epichlorohydrin and glycerol; however, the glycerol can be replaced with bisphenol-A (e.g., in "Araldite 6,084" m.p. 100° C., epoxide equivalent of 935). Details concerning ranges and modifications of components are set forth in the above-identified applications, the teachings of which are incorporated herein by reference.

The $\alpha$-olefin hydrocarbon copolymers are compounded with suitable curing agents before being bonded to the coated substrate. Typical curing aids used are sulfur, zinc oxide, and curing accelerators. Those skilled in the art can select by routine empirical experiments the best combinations of accelerators when curing a particular assembly. In addition to the above-described components, the $\alpha$-olefin copolymer may include such optional components as conventional antioxidants. It is to be understood that various modifications of the sulfur curing procedures may be employed depending upon the stock. Various procedures and modifications of sulfur curing are more particularly described in *Encyclopedia of Chemical Technology*, Kirk and Othmer, published by Interscience Encyclopedia, Inc., New York, 1953, Vol. 11, pages 892–927; *Principles of High-Polymer Theory and Practice*, Schmidt and Marlies, published by McGraw-Hill Book Co., New York, 1948, pages 556–566; *Chemistry and Technology of Rubber*, edited by M. Morton, Reinhold Publishing Corp., New York, 1959, pages 93–129; *The Applied Science of Rubber*, edited by W. J. S. Naunton, Edward Arnold Ltd., London, 1961, pages 346–413, 992–1,099.

The adhered composite article is finally obtained by heating the curable assembly under pressure. Temperatures generally range between about 130°–160° C. with about 150° C. and 160° C. being preferred. Cure times are not critical and can range from between about 10 minutes and 2 hours without adverse effect on the adhesion obtained. The cure time will vary inversely with the temperature, higher temperatures requiring shorter cure times. Those skilled in the art will select the particular conditions needed for optimum results based on such considerations as the conditions recommended in the art for the particular curing agents being used, etc. During the cure, pressure may be applied as desired.

The invention will now be described with reference to the following examples of specific embodiments thereof wherein parts and percentages are by weight unless otherwise specified.

EXAMPLE 1

PREPARATION OF CHLOROSULFONATED POLYETHYLENE LATEX

A chlorosulfonated polyethylene is selected containing about 26 percent chlorine and 1 percent sulfur prepared from linear polyethylene having a melt index of about 4.

An emulsion is prepared by adding 425 grams of a 5.9 percent solution of the chlorosulfonated polyethylene in carbon tetrachloride to a solution of 2 grams of sodium salt of lauryl alcohol sulfate (commercially available from Du Pont as "Duponol ME" dry surface active agent) in 125 ml. of water and 36 ml. of isopropanol at 25° C. in a high shear mixer. The resulting emulsion is distilled at reduced pressure at about 40°–50° C. to remove the carbon tetrachloride and some of the water. The resulting latex contains about 20–25 percent solids and has a pH of about 2.5 to 4 at 25° C.

PREPARATION OF ADHESIVE COMPOSITION

A solution of 5.5 grams of resorcinol and 5.7 ml. of 37 percent aqueous formaldehyde in 27.5 ml. of water is prepared at 25° C. and allowed to stand for about 4 to 6 hours at 25° C. The pH of this composition is about 3–4. To 5 grams of this composition at 25° C. are added 30 ml. of the chlorosulfonated polyethylene latex and 3 grams of a 20 percent dispersion of zinc oxide in water. The resulting composition has a pH of about 6.7 to 7.4 at 25° C. It is allowed to stand at 25° C. for about 6 hours before being used as an adhesive. (It would be preferred to allow it to stand for about 24 to 30 hours.)

α-OLEFIN HYDROCARBON ELASTOMER

An ethylene/propylene/1,4-hexadiene copolymer is employed which is made in accordance with the general procedures of U.S. Pat. No. 2,933,480. Representative samples of this copolymer contain about 42 percent propylene and 4 percent 1,4-hexadiene monomer units by weight and exhibit a Mooney viscosity (ML-4/250° F.) of about 70.

The elastomeric copolymer is compounded as follows on a rubber roll mill:

| Component | Parts |
|---|---|
| α-olefin hydrocarbon elastomer | 100 |
| HAF carbon black | 50 |
| naphthenic petroleum oil | 20 |
| zinc oxide | 5 |
| tetramethylthiuram monosulfide | 1.5 |
| 2-mercaptobenzothiazol (MBT) | 0.5 |
| sulfur | 1.0 |

ADHESION OF ELASTOMER TO FABRIC

The filament nylon fabric used is a plain weave with a count of 60 × 40 (obtainable as Style SN-7 from Wellington Sears, 111 West 40th Street, New York 18, New York). The spun fabric used has 48 warp ends and 36 pick ends and weighs 9.9 oz./sq. yard. The fabric is scoured with detergent to remove finishing agents, sizes, etc.

The scoured filament nylon is coated with coating composition prepared in Part B above by means of a paint brush. It is then dried for 30 minutes in a vacuum oven at 100° C.

The coated nylon is then pressed against an 80-mil thick sheet of the sulfur-curable ethylene hydrocarbon elastomer of Part. C. A 3 inch × 1-½ inch piece of cellophane is placed at one end of the elastomer to facilitate subsequent separation of the elastomer and the fabric for testing. The elastomer is supported by 10-oz. cotton duck to provide stability. The assembly is then cured at 160° C. for 30 minutes under a pressure of 200–250 psi. The peel adhesion of the resulting composite article typically displays an adhesive strength of about 36 lbs./linear inch at 25° C. As determined on an Instron tester by measuring the force necessary to separate a 1 inch wide piece of the fabric from the elastomer at a heasd speed of 2 inches/min.

ADEHSION OF ELASTOMER TO CORD

Nylon tire cord is coated by continuously running it through the coating composition prepared in Part B above at about 3 ft./min. and then through a 2-ft. column where it is contacted with a stream of air heated to about 135° C.

The coated nylon cord samples are then used to conduct "single-cord adhesion" tests or "H-pull tests" as described in India Rubber World, 114, 213–17 (1946). The coated cord samples are molded as described in the reference into the sulfur-curable ethylene hydrocarbon elastomer which was compounded as described above and the assemblies cured for 40 minutes at 160° C. under a pressure of 550 psi., starting with the mold at room temperature. The resulting composite articles are tested as described in the reference typically display adhesive strengths of about 17.5 lbs. at 25° C. and about 12.5 lbs. at 100° C.

The cord adhesion and fabric adhesion results are essentially the same if the above procedure is repeated substituting a resorcinol formaldehyde resin wherein the mole ratio of formaldehyde to resorcinol is increased to 2:1.

EXAMPLES 2 through 9

Example 1 is repeated in each of the following except that a different chlorosulfonated linear polyethylene is used each time. In all examples both fabric and cord adhesion are measured as in Parts D and E of Example 1. The differences in chlorosulfonated polyethylene and test results are set forth in Table I below. The data from Example 1 are included therein for comparison only. The term "melt index" refers to the melt index of the polyethylene before chlorosulfonation. In each case the adhesive composition is aged about one day at about 25° C.

TABLE I

| Example | Melt index | Chlorosulfonated PE Percent S | Chlorosulfonated PE Percent Cl | Dip pickup, wt. percent | Tire cord adhesion, H-pull values (lbs.) at— 25° C. | Tire cord adhesion, H-pull values (lbs.) at— 100° C. | Dip pickup, wt. percent | Fabric adhesion, lb./in. |
|---|---|---|---|---|---|---|---|---|
| 2 | 4 | 1.0 | 34.5 | 7.9 | 13.5 | 9.5 | 11 | 22 |
| 1 | 4 | 1.0 | 26 | 6.7 | 17.5 | 12.5 | 9 | 36 |
| 3 | 4 | 2.8 | 19 | 6.4 | 23 | 13 | 10 | 37 |
| 4 | 4 | 0.95 | 18.8 | 5.9 | 20 | 14 | 10 | 53 |
| 5 | 0.78 | 0.7 | 20.3 | 6.1 | 21 | 12 | 9 | 53 |
| 6 | 0.8 | 0.92 | 18.7 | 6.9 | 23 | 14 | 11 | 51 |
| 7 | 0.8 | 1.4 | 18.7 | 5.9 | 22 | 14.5 | 7 | 48 |
| 8 | 0.07 | 0.8 | 18.8 | 5.1 | 21 | 12 | 10 | 48 |
| 9 | 4 | 0.82 | 15.8 | 5.9 | 22.5 | 13.5 | 13 | 59 |

As can be seen from the table, both the fabric and tire cord adhesion values are the highest when the chlorosulfonated polyethylene contains about 15–20 percent chlorine.

EXAMPLE 10

This example illustrates a one-step preparation of adhesive composition

A. An aqueous composition is prepared at 25° C. by adding the following components successively without allowing any aging time to elapse between the successive addition: 5.7 ml. of water; 1.1 grams of resorcinol; 1.18 ml. of 37 percent aqueous formaldehyde; 46 ml. of a 21 percent solids chlorosulfonated polyethylene latex prepared according to the procedure of Example 1; and 3.0 grams of a 33 percent dispersion of zinc oxide in water. The molar ratio of resorcinol to formaldehyde is 1:1.5. The pH of the mixture resulting is about 7.4. This composition is allowed to stand for about 3 to 7 hours at 25° C. before being used to coat the nylon fabric. (It would be preferable to age for about 30 hrs.)

B. A second composition is prepared in the same way except that equal molar proportions of formaldehyde and resorcinol are employed. After nylon tire cord and fabric have been coated and dried and composite articles have been prepared and cured as described in Example 1, parts D and E, the resulting adhered articles are tested in accordance with the procedure of Example 1 for cord and fabric adhesion. The table which follows gives the results.

TABLE II

| Composition | F/R[1] | Dip pickup, wt. percent | Tire cord adhesion, H-pull (lb.) at 25° | Tire cord adhesion, H-pull (lb.) at 100° | Dip pickup, wt. percent | Fabric adhesion (lb./in.) 25° |
|---|---|---|---|---|---|---|
| A | 1.5 | 5.1 | 16.5 | 11 | 10 | 37 |
| B | 1.0 | 6.0 | 17 | 11.5 | 8 | 37 |

[1] Ratio of formaldehyde to resorcinol.

EXAMPLE 11

PREPARATION OF THE POLYESTER PRETREATING COMPOSITIONS

A slurry is prepared in the following manner. Add 0.24 lb. of a paste containing 75 percent by weight of dioctyl sodium sulfosuccinate and 25 percent water (commercially available from American Cyanamid Company as "Aerosol OT") to 6.26 lbs. of warm water and mix at slow speed until completely dissolved (approximately 5 minutes are required). Add the solution obtained to 16 lbs. of water at room temperature while mixing at slow speed. To the resulting solution add 7.50 lbs. of "blocked" diisocyanate, the diphenyl ester of 4,4'-methylene-dicarbanilic acid (commerically available from Du Pont as "Hylene MP" organic isocyanate), and mix at slow speed until completely dispersed. The resulting composition is added to a 4.6-gallon ball mill containing approximately 20 lbs. of grinding media. Ball mill the composition on a roller mixer for 72 hours. The resulting composition is ball milled or mixed one hour before using in order to assure complete suspension; high speed mixing is avoided to prevent foaming. The slurry of blocked polyisocyanate contains 25 percent solids.

Add 0.14 lb. of epoxy resin, the condensation product of glycerine and epichlorohydrin, having an average molecular weight of about 300 and an epoxide equivalent of 140–165 ("Epon 812"), to 8.37 lbs. of water at room temperature and mix slowly. Prepare a solution containing 2 percent solids by adding 5 grams of gum tragacanth to 245 grams of water at room temperature; mix until completely dissolved (approximately 5 minutes required). Add about 0.20 lbs. of the 2 percent gum solution (freshly mixed) to the epoxy resin-water solution while mixing slowly. Finally, add 1.29 lbs. of the blocked isocyanate slurry to the resulting mixture and mix for 3 min. at slow speed.

The overall composition contains 5.0 percent solids and is made in the following proportions: 8.37 parts of water (room temperature); 0.14 part of epoxy resin; 0.2 part of the 2 percent solution of gum tragacanth; and 1.29 parts of a 25 percent slurry of blocked organic isocyanate. This dip is not stable and the solids will settle out very quickly when not agitated or circulated. When in use, the dip must be circulated using a pump or agitated manually every 5 to 10 minutes. For best results this dip should be made fresh each day it is to be used.

A resorcinol-formaldehyde (RFL) dipping composition is prepared in the following way. 1.38 Pounds of resorcinol, 2.39 lbs. of 1.57 percent aqueous sodium hydroxide, 2.02 lbs. of 37 percent aqueous formaldehyde, and 27.8 lbs. of water (at 75°–78° F.) are stirred together and allowed to age for 6 hours. Then the resulting composition is mixed with 30.50 lbs. of 41 percent "Gen-Tac" (a terpolymer of butadiene/styrene/2-vinyl pyridine), 7.64 lbs. of water at 75° F. and 1.42 lbs. of 28 percent aqueous ammonium hydroxide. The final composition is allowed to age at least 12 hours before use.

Type 68, 840/2 "Dacron" polyester tire cord is dipped in the first pre-treating composition described above and dried for 1.3 minutes at 450° F. The pick-up (dry weight) is about 0.4 percent. The coated cord is then dipped in the resorcinol-formaldehyde composition and dried for 1.3 minutes at 450° F. The pick-up (dry weight) of the second coat is about 4 percent.

PREPARATION OF CHLOROSULFONATED POLYETHYLENE LATEX DIP

A chlorosulfonated polyethylene is selected containing about 20 percent chlorine and 1 percent sulfur. A 12.5 percent solids solution is prepared by dissolving this chlorosulfonated polyethylene and 0.1 phr. (parts/100 parts of polymer) dinitrotoluene in a 88/12 benzene/isopropanol mixture. Two parts of this solution are then added to one part of water containing 8 phr. of sodium alkyl benzene sulfonate ("Nacconol NRSF") and 0.25 phr. of sodium nitrite in a high shear mixer at 80° C. Solvent is removed from the resulting emulsion with steam at atmospheric pressure to give a latex. After 0.8 part of ammonium alginate has been added for each 100 parts of latex solids, the composition is allowed to cream by standing for several days at room temperature. A 53 percent solids latex resulted.

The 53 percent solids latex is diluted to 41 percent solids with water.

A phenol-aldehyde resin composition is prepared at 25°–30° C. by dissolving 44 parts of resorcinol flakes in 88 parts of distilled water, and adding slowly with stirring 23.8 parts of a 37 percent aqueous formaldehyde solution. After two minutes mixing, the resulting composition is ripened by storage at 25°–30° C. for one hour. Then 155.8 parts are slowly added to 286 parts of the (41 percent solids) latex with stirring. Dilute aqueous sodium hydroxide is added to adjust the pH (at 25°–30° C.) to 7.3. Four days storage follows before dips are made.

The polyester tire cord treated as in Part A above is dipped in the resin-latex composition; the pick-up after drying under nitrogen (at 210° C. for 0.7 minute) is about 4.8 percent based on the weight of the cord.

PREPARATION OF SUBSTRATE COMPOSITION

The substrate composition is a carcass stock compounded according to the following recipe:

| Component | Parts |
|---|---|
| α-Olefin Hydrocarbon Elastomer (of Ex. 1) | 100 |
| HAF Carbon Black | 80 |
| Naphthenic Petroleum Oil ("Necton 60") | 47.5 |
| Zinc Oxide | 5 |
| Tetramethyl Thiuram Monosulfide | 1.5 |
| 2-Mercaptobenzothiazole | 0.75 |
| Sulfur | 1.5 |
| Stearic Acid | 1.0 |

PREPARATION OF ADHERED ASSEMBLY

The coated polyeser cords are cured against the substrate composition at 160° C. for 40 minutes at 3,500 lbs./sq. in. pressure. The adhesion of the resulting cured assembly is then measured by the "H-pull" test, and it is typically found that the assembly will display about 18 lbs. at room temperature and 12 lbs. at 100° C.

If for comparison, the above procedure is repeated except that the coating of this invention described in Part B is omitted, the "H-pull" values typically drop to 8 lbs. and 5 lbs., respectively.

EXAMPLE 12

PREPARATION OF POLYESTER PRETREATING COMPOSITION

Dissolve 20 parts by weight of the diphenyl ester of 4,4'-methylene-dicarbanilic acid ("Hylene MP" organic isocyanate) with stirring in 100 parts of 2-pyrrolidone. Then add, again with stirring, 20 parts of the epoxy resin ("Epon 812") and 3 parts of 10 percent by weight aqueous sodium hydroxide. The ratio of pyrrolidone to "Epon 812" to "Hylene MP" is 5:1:1. Use the fresh composition thus made.

Polyester tire cord ("Dacron" tire cord 840/2/2; Type 68) is coated with the pretreating composition described above and cured in a dielectric field while being simultaneously drawn to yarn at about 1,000 yards/minute windup speed.

APPLICATION OF CHLOROSULFONATED POLYETHYLENE LATEX DIP

The polyester tire cord, coated with the pretreating composition as described in Part A above, is then dipped in an aqueous resin-latex adhesive composition similar to that of Part B of Example 11 except that the pH was not adjusted before use) and dried for one minute at 435° F. The percent pick-up (based on the pretreated cord weight) is about 15.

PREPARATION OF ADHERED ASSEMBLY

The carcass stock described above in Part C of Example 11 is cured against the coated polyester tire cord for 40 minutes at 160° C. It is typically found that the assembly will display "H-pull" values of about 13 lbs. at room temperature and 9 lbs. at 100° C.

When, for comparison, the coating of this invention set forth in Part B above is omitted, the values typically drop to about 4 lbs. and 3 lbs., respectively.

EXAMPLE 13

The following example illustrates the use of a precondensed resorcinol-formaldehyde resin in the preparation of an adhesive composition for nylon cord and fabric.

4.0 Parts of "Penacolite R-2170" (a precondensed resorcinol-formaldehyde resin of 75 percent solids content from Koppers Co.) is dissolved in 70 parts of water containing 0.12 parts of sodium hydroxide and 2.6 parts of 37 percent aqueous formaldehyde solution is added. The solution is allowed to stand for 2 hours at 25° C. and is then added to 51 parts of a 47 percent solids latex of a linear chlorosulfonated polyethylene, containing 20 percent chlorine and 1 percent sulfur, and 20 parts of water. The resulting adhesive dip has a pH of about 7.7 and after aging for 1 hour at 25° C. is used to coat nylon cord and fabric.

Typical adhesion results using a stock of the following composition:

| | Parts |
|---|---|
| α-Olefin Hydrocarbon Elastomer (Ex. 1) | 100 |
| HAF Black | 80 |
| Naphthenic Petroleum Oil | 47.5 |
| Stearic Acid | 1 |
| Zinc Oxide | 5 |
| Tetramethylthiuram monosulfide | 1.5 |
| 2-Mercaptobenzothiazole | 0.75 |
| Sulfur | 1.0 | are as follows:

| Dip pickup (%) | H-pull (lb.) 25° | 100°C. | Dip pickup (%) | Fabric Adhesion (lbs./in.) 25° | 100°C. |
|---|---|---|---|---|---|
| 6.0 | 18.3 | 13.1 | 16 | 55 | 29.5 |

EXAMPLE 14

The following example illustrates an adhesive composition for rayon.

A solution is prepared containing 2.76 parts of resorcinol, 4.1 parts of 37 percent aqueous formaldehyde solution, and 4.7 parts of 7.8 percent sodium hydroxide solution in 55.6 parts of water. This solution, which has a pH of about 9, is allowed to stand for about 6 hours at 25° C. To 31.4 parts of this solution are then added 26.6 parts of a 45.5 percent solids latex of chlorosulfonated polyethylene and 12 parts of water. The adhesive mix which has a pH of about 9 is allowed to stand at 25° C. for 16–24 hours before being used to coat rayon tire cord (1100/2). Typical adhesion results using the elastomer stock of the same composition as in Example 13 are as follows:

| | |
|---|---|
| Dip pickup (%) | 8.9 |
| H-pull (lb.) at 25°C. | 24 |
| at 100°C. | 12 |

The following illustrates a preparation of a latex of a chlorosulfonated polyethylene for use in this invention.

An emulsion is prepared by mixing at 70°–80° C. in an enclosed high shear mixer, 100 parts of a solution of 11.6 percent of the chlorosulfonated polyethylene and 0.93 percent of "Nacconol NRSF" (a sodium alkylbenzene sulfonate from National Aniline Co.) in benzene-isopropanol (88/12) with 60 parts of water containing 0.029 parts of sodium nitrate. The solvent is removed by contacting the emulsion with steam and the the resulting dilute latex is concentrated to 47 percent solids by creaming with ammonium alginate.

The improvement obtainable by this invention enables $\alpha$-olefin hydrocarbon copolymers to be firmly bonded to substrates such as tire cord or fabrics by a very simple and safe operation. It is quite unexpected that the presence of the phenol-aldehyde resin solution in the dispersion with the chlorosulfonated polyethylene did not adversely affect the properties of the latter.

As many widely different embodimnts of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. An adhered composite article consisting essentially of a cured chain-saturated copolymer of at least one $C_2$-$C_{18}$ $\alpha$-monoolefin with at least one nonconjugated hydrocarbon diene firmly adhered by a dried cured coating to a substrate selected from the group consisting of polyamide, cellulosic, and polyester substrate wherein the coating is made from an aqueous dispersion containing (a) a chlorosulfonated polyethylene, and (b) a resorcinol-formaldehyde type resin; with the proviso that when the substrate is a polyester, the article also contains a precoat on the polyester substrate wherein the precoat is (I) a mixture of a polyepoxide and an aromatic polyisocyanate adduct with an overcoating of a mixture of a resorcinol-formaldehyde resin and a vinyl pyridine copolymer latex, or (II) a mixture of 2-pyrrolidone, polyepoxide, alkaline catalyst and a blocked polyisocyanate or formaldehyde.

2. The composite article of claim 1 wherein said copolymer is a copolymer of ethylene, propylene, and a nonconjugated diene.

3. The composite article of claim 2 wherein said chlorosulfonated polyethylene contains about 10–26 percent chlorine and about 0.5–3 percent sulfur.

4. The composite article of claim 3 wherein said copolymer contains about 20–75 weight percent ethylene monomer units.

5. The composite article of claim 4 wherein said substrate is a polyester pretreated with a mixture of a polyepoxide, and an aromatic polyisocyanate adduct with an overcoating of a mixture of a resorcinol-formaldehyde resin and a vinyl pyridine copolymer latex.

6. The composite article of claim 4 wherein said substrate is a polyester pretreated with a mixture of 2-pyrrolidone, polyepoxide, alkaline catalyst, and a blocked polyisocyanate or formaldehyde.

7. The composite article of claim 4 wherein the substrate is nylon.

* * * * *